3,553,961
COMBUSTION ENGINE SYSTEM
Leo A. McReynolds, Bartlesville, Okla., assignor to Phillips Petroleum Company, a corporation of Delaware
Filed Dec. 26, 1968, Ser. No. 787,048
Int. Cl. F01k 23/02; F01n 3/14
U.S. Cl. 60—13     3 Claims

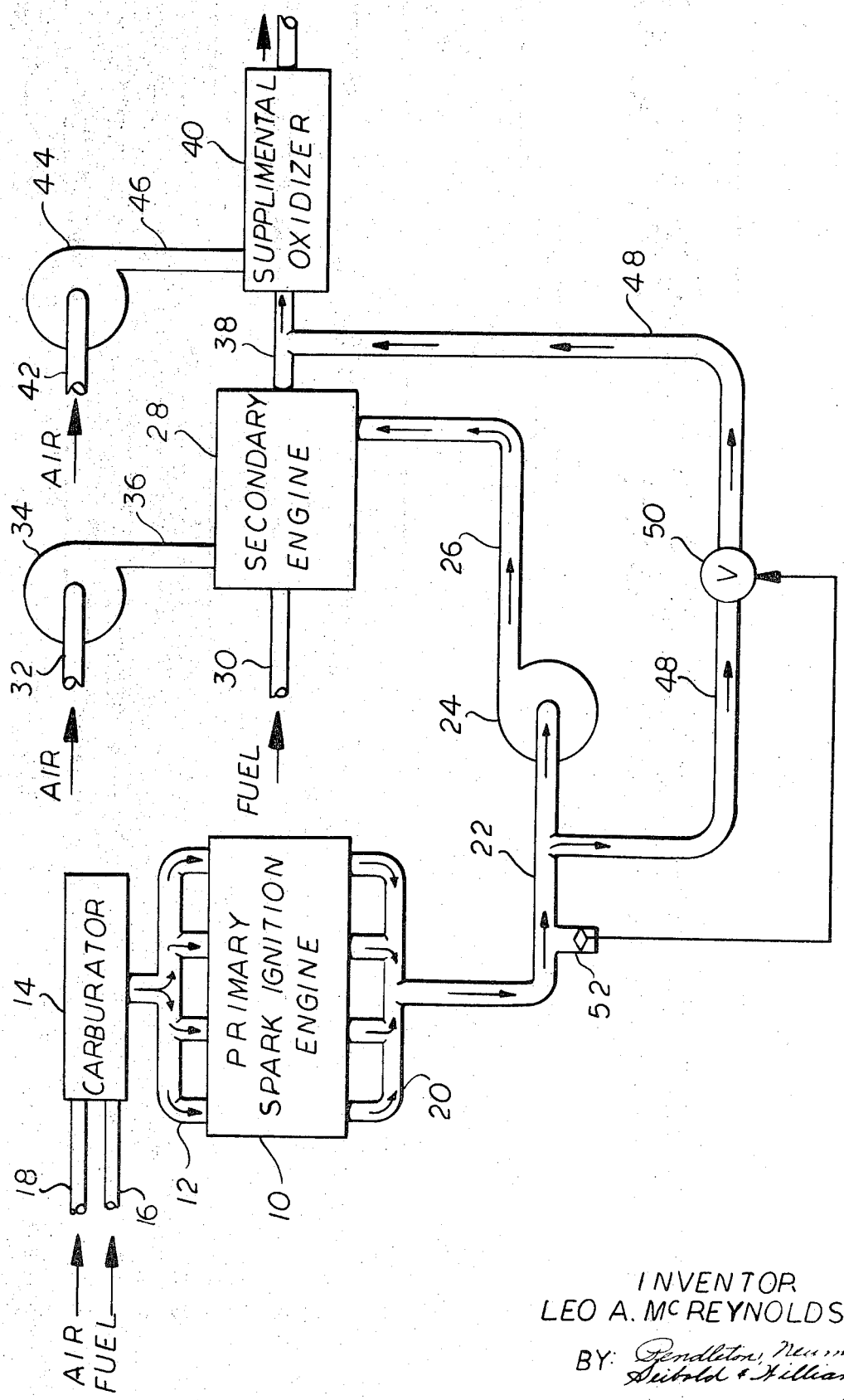

ABSTRACT OF THE DISCLOSURE

A dual engine system is provided in which the exhaust from a primary engine is passed to the combustion zone of a secondary engine to reduce the concentration of carbon monoxide, unburned hydrocarbons and nitrogen oxides in the exhaust gases discharged from the system.

This invention relates to a combustion engine system and has for an object the provision of an engine system in which the percentages of noxious products normally present in the exhaust gases are markedly reduced.

The need to reduce certain components of vehicle emissions to the atmosphere is recognized as critical and it is believed that the most important undesirable constituents present in the exhaust gases from vehicles are carbon monoxide, unburned hydrocarbons and the oxides of nitrogen. Various means have been previously suggested for reducing or eliminating these components from combustion engine exhausts. These means include parameter fuel-air mixture adjustments, catalytic mufflers, exhaust recirculation, exhaust manifold air injection and the like. However, these previously suggested means are normally not effective to remove any more than two of the three undesirable components above noted. For example, the enrichment of the fuel-air mixture supplied to the engine has a tendency to reduce the nitrogen oxides but increases the hydrocarbons and carbon monoxide in the exhaust. If the fuel-air mixture is "lean" the opposite effect is produced whereby there is an increase in the nitrogen oxides and a corresponding decrease in the carbon monoxide and unburned hydrocarbons. Catalytic mufflers are generally effective for either hydrocarbon and carbon monoxide removal or for nitrogen oxide removal but not for both. Air injection into the exhaust manifold is often effective to reduce hydrocarbon and carbon monoxide content but not the nitrogen oxide content.

Accordingly, a further object of this invention is the provision of an engine system in which the final exhaust effluent contains reduced quantities of undesired emissions, namely, hydrocarbons, carbon monoxide and nitrogen oxides.

A further object of this invention is the provision of a two engine system which is effective to obtain maximum power from the hydrocarbon fuel used and at the same time produces an exhaust which is relatively free from carbon monoxide, hydrocarbons and nitrogen oxides.

Further and additional objects will appear from the following description and the appended claims.

The objective of this invention are met by the provision of a dual engine system comprising a variable speed primary engine of the spark ignition type (such as one used in the ordinary automobile) in which the stoichiometric ratio of hydrocarbon fuel to air passed to the combustion zone is substantially in excess of 1, whereby the normal exhaust from the primary engine includes relatively high concentrations of carbon monoxide and unburned hydrocarbons but a relatively low concentration of nitrogen oxides. The exhaust from the primary engine is then introduced into the combustion zone of a smaller secondary engine in which the fuel-air mixture is adjusted "lean," that is, the stoichiometric ratio fuel to air introduced into the secondary engine is not in excess of about 1. This secondary engine may be of the reciprocal piston type but it is preferably of the gas turbine type. Because of the "lean" fuel-air mixture charged to the secondary engine, the carbon monoxide and unburned hydrocarbons in the exhaust from the primary engine cycled thereto will be oxidized. Inasmuch as the secondary engine is smaller than the primary engine, the total nitrogen oxide produced by the system will be minimized. If desired, the exhaust effluent from the secondary engine may be passed through a supplementary oxidizer, such as an afterburner or catalytic reactor, to further reduce the amounts of any carbon monoxide or un burned hydrocarbons that may be present. Furthermore, in order to insure that the fuel-air ratio in the secondary engine remains "lean," the exhaust from the primary engine may be arranged to at least partially bypass the secondary engine and flow directly to the supplemental oxidizer under primary engine operating conditions in which abnormally large amounts of carbon monoxide or unburned hydrocarbons will be present in the gas. Thus, in the operation of an automobile or other vehicle under decelerating conditions, the amounts of hydrocarbons and carbon monoxide increase markedly. Accordingly, a bypass conduit is provided for diverting at least a portion of the primary engine exhaust from the combustion zone of the secondary engine when these conditions obtain. This may be done by providing a valve in the bypass conduit which is responsive to intake manifold pressures, exhaust manifold pressures or other conditions of operation of the primary engine which are normally related to the carbon monoxide hydrocarbon content of the primary engine exhaust gas.

For a more complete understanding of this invention, reference will now be had to the accompanying drawing which shows in schematic form one example of a dual engine system of the type herein contemplated. This system is particularly suitable for use in various types of vehicles such as automobiles, trucks, tractors and boats where the primary engine is of the spark ignition, variable speed type and where it may be useful to have a supplemental power source such as that which may be contributed by a relatively constant speed secondary engine for the operation of vehicle accessories such as air conditioning, power steering, battery charging and the like.

As shown in the drawing, there is provided a primary engine 10 which is of the conventional spark ignition type. The engine is provided with an intake manifold 12, a carburetor 14, a fuel intake conduit 16, and an air intake conduit 18. The primary engine is also provided with a conventional exhaust manifold 20 from which exhaust gases are withdrawn through conduit 22, centrifugal pump 24 and conduit 26 and discharged into the combustion zone of a secondary engine 28 which is of the gas turbine type. Supplemental fuel for the engine 28 is introduced through conduit 30 and air for supplying combustion is introduced through conduit 32, centrifugal pump 34 and conduit 36.

The exhaust from the secondary engine passes through conduit 38 to a supplemental oxidizer 40, which takes the form of a catalytic converter. If desired, supplemental air may be supplied to this oxidizer through conduit 42, pump 44 and conduit 46. Means is also provided for passing at least a portion of the exhaust from the primary engine 10 directly to the oxidizer 40, thereby bypassing the secondary engine 28. This is accomplished by conduit 48 having a regulator valve 50 which is actuated by a pressure sensor 52 in response to the exhaust manifold pressure in the exhaust line 22.

In the operation of the system, the carburetor 14 is adjusted for maximum power requirements. This involves the adjustment of the fuel-air ratio so that the intake is on the "rich" side. Thus, the adjustment is made such that in normal operation the stoichiometric fuel-air ratio in the manifold 12 is greater than 1 and preferably is between about 1.1 and 1.2. A stoichiometric fuel-air ratio of 1 represents a mixture in which there is just enough air in the mixture to burn all of the hydrocarbon present in the fuel completely to carbon dioxide and water. If the stoichiometric ratio is 1.1, this means there is a deficiency of oxygen in an amount equivalent to about ten percent. In the operation of the primary engine, the "rich" mixture of air and fuel is charged through the manifold 12 to the spark ignition engine which is the primary power plant for the vehicle in which it is assembled. Because of the "rich" mixture in the charge, the exhaust gases escaping through manifold 20 are relatively low in nitrogen oxide content and relatively high in carbon monoxide and unburned hydrocarbon content. The exhaust containing these undesired impurities passes through conduit 22, pump 24 and conduit 26 and is injected into the combustion zone of the secondary engine 28 which takes the form of a gas turbine. This secondary engine is smaller than the primary engine and is operated in a conventional manner by the separate introduction of air and fuel into the combustion zone under conditions to give a "lean" fuel-air mixture wherein the stoichiometric ratio of fuel to air is not in excess of about 1 but preferably somewhat less than 1 to provide surplus air for the combustion of the carbon monoxide and unburned hydrocarbons in the primary engine exhaust passing into the secondary engine through conduit 26. Inasmuch as the secondary engine is somewhat smaller than the primary engine and even though it is operated on the "lean" side, the total amount of nitrogen oxide which is normally developed under "lean" operating conditions is considerably less than would be the case if the primary engine were operated under "lean" conditions. The exhaust from the secondary engine contains little or no carbon monoxide and unburned hydrocarbons depending on operating conditions. However, the combined exhaust is preferably passed through the supplemental oxidizer to substantially completely remove the carbon monoxide and unburned hydrocarbons as is well known.

It is well understood that the exhaust from a spark ignition engine will contain higher than normal levels of carbon monoxide and unburned hydrocarbons during deceleration or braking. Accordingly, it may be desirable not to overload the secondary engine with these combustible components from the exhaust conduit 26 when these load conditions prevail in the primary engine. To avoid this the bypass 48 having a control valve 50 is provided, the valve being operated in response to the load conditions obtaining in the primary engine. In the embodiment shown, the response is provided by the pressure sensor 52, which is adapted to open the valve 50 when the pressure in the exhaust manifold 20 rises to a predetermined level say, for example, 15 pounds per square inch. If desired, the pressure sensor may be associated with the intake manifold 12 of the primary engine or the load characteristics may be sensed in other ways known to those skilled in this art.

The secondary engine is preferably a gas turbine engine and is used to operate accessories on the vehicle such as air conditioning, power steering and the like. Ordinarily it will operate at substantial constant speed under constant load conditions while the primary engine is, of course, subject to substantial variations in speed and load which may materially affect the amount of carbon monoxide and unburned hydrocarbons formed in the exhaust, particularly when operated under "rich" fuel-air mixture conditions as herein contemplated.

While a particular embodiment of this invention is described in the foregoing, it will, of course, be apparent that many changes and modifications may be made without departing from the spirit and scope of the appended claims.

What is claimed is:

1. A dual engine system comprising a primary engine, a secondary engine, means for conducting the exhaust gases from the primary engine to the combustion zone of the secondary engine, means including a supplemental gas oxidizer for removing the combined exhaust gases from the system, bypass means for conducting at least a portion of the exhaust of said primary engine directly to the supplemental oxidizer thereby bypassing said secondary engine and means responsive to the operating load on said primary engine for regulating flow of primary engine exhaust gases through said bypass means.

2. A dual engine system comprising a variable speed primary engine of the spark ignition type in which the stoichiometric ratio of hydrocarbon fuel to air is substantially in excess of 1 whereby the normal exhaust from said engine includes carbon monoxide and unburned hydrocarbons, a secondary engine operating at substantial constant speed in which the stoichiometric ratio of hydrocarbon fuel to air is not in excess of about 1, means for conducting the exhaust gases from the primary engine to the combustion zone of the secondary engine, means including a supplemental gas oxidizer for discharging the combined exhaust gases from the secondary engine, bypass means for conducting at least a portion of the exhaust of said primary engine directly to the supplemental oxidizer thereby bypassing said secondary engine and means responsive to the operating load on said primary engine for regulating flow of primary engine exhaust gases through said bypass means.

3. The system recited in claim 2 in which the secondary engine is a gas turbine engine.

References Cited

UNITED STATES PATENTS

| 2,356,557 | 8/1944 | Anxionnaz | 60—13 |
| 2,583,651 | 1/1952 | Horning | 60—30 |
| 2,633,698 | 4/1953 | Nettel | 60—13 |
| 3,163,984 | 1/1965 | Dumont | 60—13 |
| 3,442,077 | 5/1969 | Youhouse | 60—30 |

FOREIGN PATENTS

| 1,012,365 | 4/1952 | France | 60—13 |
| 1,021,303 | 3/1966 | Great Britain | 60—13 |

DOUGLAS HART, Primary Examiner

U.S. Cl. X.R.

60—30